United States Patent
Wang

(10) Patent No.: US 9,588,933 B2
(45) Date of Patent: Mar. 7, 2017

(54) SINGLE WIRE SERIAL INTERFACE MASTER MODULE AND METHOD THEREOF FOR SAMPLING DATA INFORMATION

(71) Applicant: Huawei Technologies Co., Ltd., Shenzhen, Guangdong (CN)

(72) Inventor: Qi Wang, Shanghai, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 541 days.

(21) Appl. No.: 14/089,401

(22) Filed: Nov. 25, 2013

(65) Prior Publication Data

US 2014/0189178 A1 Jul. 3, 2014

(30) Foreign Application Priority Data

Dec. 31, 2012 (CN) .......................... 2012 1 0590316

(51) Int. Cl.
| | |
|---|---|
| *G06F 13/00* | (2006.01) |
| *G06F 13/42* | (2006.01) |
| *G06F 13/40* | (2006.01) |
| G06F 13/364 | (2006.01) |
| H04L 12/403 | (2006.01) |

(52) U.S. Cl.
CPC ...... *G06F 13/4295* (2013.01); *G06F 13/4072* (2013.01); *G06F 13/364* (2013.01); *G06F 13/4291* (2013.01); *H04L 12/403* (2013.01)

(58) Field of Classification Search
None
See application file for complete search history.

(56) References Cited

U.S. PATENT DOCUMENTS

| | | | |
|---|---|---|---|
| 2003/0188202 A1 | 10/2003 | D'Angelo et al. | |
| 2005/0259609 A1* | 11/2005 | Hansquine | H04L 12/403 370/328 |

(Continued)

FOREIGN PATENT DOCUMENTS

| | | |
|---|---|---|
| CN | 1449168 A | 10/2003 |
| CN | 1639672 A | 7/2005 |

(Continued)

*Primary Examiner* — Henry Tsai
*Assistant Examiner* — Aurangzeb Hassan
(74) *Attorney, Agent, or Firm* — Leydig, Voit & Mayer, Ltd.

(57) ABSTRACT

The present invention discloses a single wire serial interface (SSI) master module, including: a sample delay controlling unit, configured to send a delay instruction; the state machine unit, configured to wait, according to the delay instruction, for a delay period starting from a moment when an SSI master module completes sending the last bit of address information in a read operation frame, and then send a sample control signal to a selector unit; the selector unit, configured to enable a transmission channel with a sampling unit after receiving the sample control signal; and the sampling unit, configured to sample data information from an SSI slave module. In the present invention, the state machine unit delays sending the sample control signal, and the sampling unit is controlled to delay sampling the data information, which avoids a data reception error caused by slow discharging of an IO PAD.

6 Claims, 3 Drawing Sheets

(56) References Cited

U.S. PATENT DOCUMENTS

2009/0161588 A1* 6/2009 Maldonado .......... H04B 1/0483
                                                    370/311
2011/0185215 A1* 7/2011 Neben .................. G06F 1/12
                                                    713/401

FOREIGN PATENT DOCUMENTS

CN        101834715 A     9/2010
CN        102661705 A     9/2012

* cited by examiner

SINGLE WIRE SERIAL INTERFACE MASTER MODULE AND METHOD THEREOF FOR SAMPLING DATA INFORMATION

CROSS-REFERENCE TO RELATED APPLICATIONS

This application claims priority to Chinese Patent Application No. 201210590316.1, filed on Dec. 31, 2012, which is hereby incorporated by reference in its entirety.

TECHNICAL FIELD

The present invention relates to the field of communications technologies, and in particular, to a single wire serial interface (SSI) master module and a method thereof for sampling data information.

BACKGROUND

A chip having more wires of peripheral interfaces requires more input and output pads (IO PAD), and the chip has a larger area. An SSI is a common peripheral interface at present, where the most significant feature thereof is transmission performed by using only one wire. Therefore, the area of the chip may be controlled in a better way by using the SSI as a peripheral interface.

As shown in FIG. 1, two chips connected through an SSI need their own SSI modules, which are an SSI master module and an SSI slave module respectively.

As shown in FIG. 2, an SSI module uses a bidirectional pad (PAD), which uses three wires bore different signals respectively to connect to the PAD, where sd_in represents an input signal, sd_out represents an output signal, and sd_out_oe represents an output control signal, and sd_out_oe is active high.

The SSI uses a single wire for transmission; therefore, a scenario where a right to control the single wire is switched will definitely occur in a read operation. In a switch process, because no driver is available, the IO PAD is controlled by a pull-down resistor. After the SSI Master releases the right to control the single wire, the pull-down resistor discharges automatically. Because the discharging speed is low, if the SSI Master performs sampling, it is possible that the level on the single wire is not completely pulled down but is semi-high. If the SSI Master samples data too early by sampling the semi-high level, a data reception error may be caused.

At present, in order to solve the problem of data reception errors, a pull-down resistor is added to the board level to speed up the discharging of the IO PAD pull-down resistor. However, this method has low stability and flexibility, and therefore cannot properly solve the problem of data reception errors.

SUMMARY

Embodiments of the present invention provide an SSI master module and a method thereof for sampling data information, so as to solve the problem of data reception errors in the prior art where an SSI is used.

In a first aspect, an embodiment of the present invention provides a single wire serial interface SSI master module, including a state machine unit, a selector unit, a sampling unit, and a sample delay controlling unit, where:

the sample delay controlling unit is connected to the state machine unit, and is configured to send a delay instruction to the state machine unit before the SSI master module, after being powered on or reset each time, sends the last bit of address information in the first read operation frame;

the state machine unit is connected to the selector unit, and is configured to wait, according to the delay instruction, for a delay period starting from a moment when the SSI master module completes sending the last bit of the address information in the read operation frame, and then send a sample control signal to the selector unit;

the selector unit, one end of which is connected to the sampling unit and the other end of which is connected to an SSI slave module through a single wire, is configured to, after receiving the sample control signal, enable a transmission channel between the selector unit and the sampling unit, so that the SSI slave module inputs data information corresponding to the address information in the read operation frame to the sampling unit; and the sampling unit is configured to sample the data information from the SSI slave module.

In a first possible implementation of the first aspect, the delay instruction sent by the sample delay controlling unit includes configuration information mst_ck_cfg for indicating the delay period; and the state machine unit is specifically configured to wait, according to the delay instruction, for a delay period 0.5×mst_ck_cfg starting from the moment when the SSI master module completes sending the last bit of the address information in the read operation frame, and then send the sample control signal to the selector unit.

With reference to the first possible implementation of the first aspect, in a second possible implementation, the configuration information mst_ck_cfg in the delay instruction sent by the sample delay controlling unit satisfies the following condition: (Master Delay)$_{WC}$+(Slave Delay)$_{WC}$+2× (Board_dly)$_{WC}$+CLK_SKEW<0.5×mst_ck_cfg+T1−T2; where (Master Delay)$_{WC}$ is a maximum delay for signal transmission on a side of the SSI master module, (Slave Delay)$_{WC}$ is a maximum delay for signal transmission on a side of the SSI slave module, (Board_dly)$_{WC}$ is a maximum delay for signal transmission of a board level, CLK_SKEW is a maximum clock deviation, T1 is a period from the moment when the SSI master module completes sending the last bit of the address information in the read operation frame to a moment when the SSI master module starts checking a read data synchronization bit in the read operation frame, and T2 is a period from a moment when the SSI slave module receives the last bit of the address information in the read operation frame sent by the SSI master module to a moment when the SSI slave module obtains a right to control the single wire.

In a second aspect, an embodiment of the present invention provides a method for a single wire serial interface SSI master module to sample data information, including:

sending a read operation frame to an SSI slave module connected to an SSI master module; and waiting for a delay period starting from a moment when the last bit of address information in the read operation frame is sent, and then sampling data information sent by the SSI slave module after receiving the read operation frame.

In a first possible implementation of the second aspect, the sampling the data information sent by the SSI slave module after receiving the read operation frame includes:

checking whether a read data synchronization bit in a write operation frame sent by the SSI slave module after receiving the read operation frame is valid; and if the read data synchronization bit is valid, sampling the data information sent by the SSI slave module.

With reference to the second aspect or the first possible implementation of the second aspect, in a second possible implementation, the delay period is 0.5×mst_ck_cfg and satisfies the following condition: (Master Delay)$_{WC}$+(Slave Delay)$_{WC}$+2×(Board_dly)$_{WC}$+CLK_SKEW<0.5×mst_ck_cfg+T1−T2; wherein (Master Delay)$_{WC}$ is a maximum delay for signal transmission on a side of the SSI master module, (Slave Delay)$_{WC}$ is a maximum delay for signal transmission on a side of the SSI slave module, (Board_dly)$_{WC}$ is a maximum delay for signal transmission of a board level, CLK_SKEW is a maximum clock deviation, T1 is a period from the moment when the SSI master module completes sending the last bit of the address information in the read operation frame to a moment when the SSI master module starts checking a read data synchronization bit in the read operation frame, and T2 is a period from a moment when the SSI slave module receives the last bit of the address information in the read operation frame sent by the SSI master module to a moment when the SSI slave module obtains a right to control the single wire.

In the embodiments of the present invention, a technical solution is employed where a sample delay controlling unit is added to an SSI master module to send a delay instruction to a state machine unit, so that the state machine unit delay sending a sample control signal, and a sampling unit is controlled to delay sampling data information, which may avoid the problem of data reception errors caused by slow discharging of an IO PAD pull-down resistor. Compared with the method of adding a board level pull-down resistor in the prior art, the solution according to the embodiments has better stability and flexibility.

DESCRIPTION OF EMBODIMENTS

Figure 1:
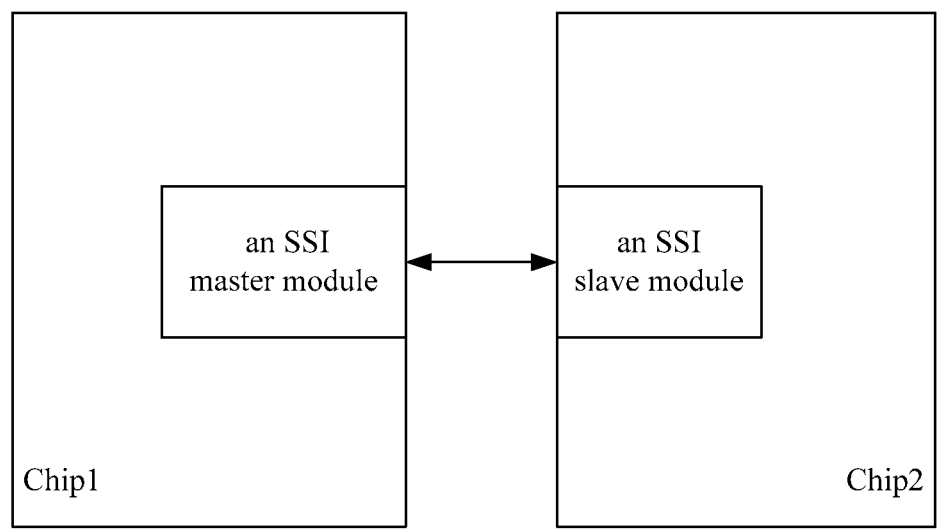
FIG. 1 is a schematic diagram of two chips connected through an SSI.
Figure 2:
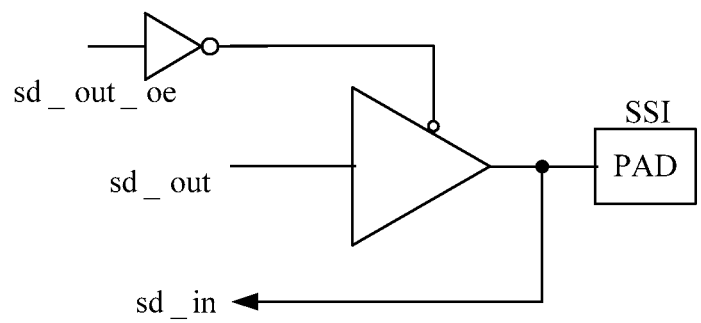
FIG. 2 is a schematic diagram of connections between an SSI module and a bidirectional pad.
Figure 3:
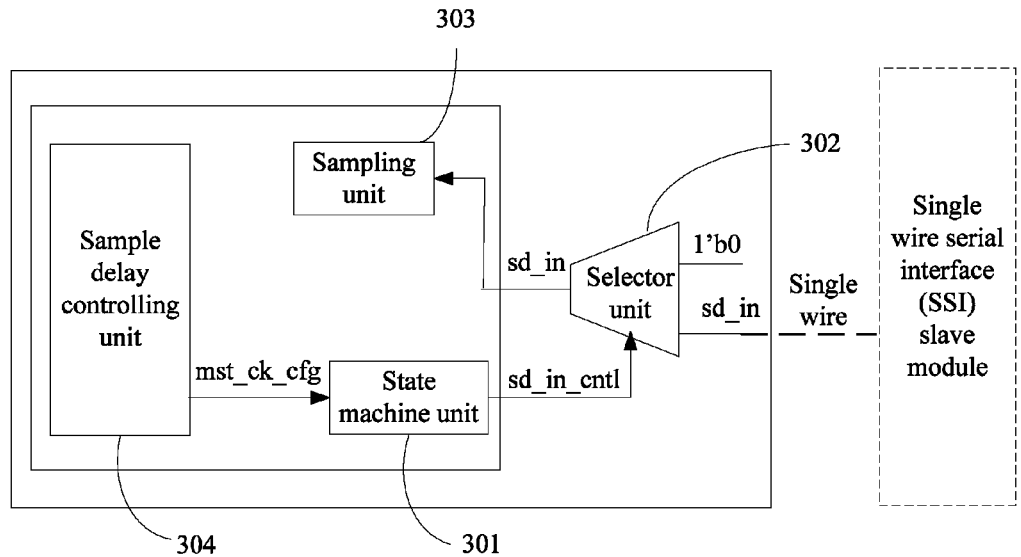
FIG. 3 is a schematic structural diagram of an SSI Master according to an embodiment of the present invention.

Referring to FIG. 3, an embodiment of the present invention provides an SSI master module. The SSI master module is connected to an SSI slave module through a single wire. The SSI master module includes a state machine unit 301, a selector unit 302, a sampling unit 303, and a sample delay controlling unit 304.

The sample delay controlling unit 304 is connected to the state machine unit 301, and is configured to send a delay instruction to the state machine unit 301 before the SSI master module, after being powered on or reset each time, sends the last bit of address information in the first read operation frame.

The state machine unit 301 is connected to the selector unit 302, and is configured to wait, according to the delay instruction, for a delay period starting from a moment when the SSI master module completes sending the last bit of the address information in the read operation frame, and then send a sample control signal to the selector unit 302.

The selector unit 302, one end of which is connected to the sampling unit 303 and the other end of which is connected to an SSI slave module through a single wire, is configured to, after receiving the sample control signal, enable a transmission channel between the selector unit and the sampling unit, so that the SSI slave module inputs data information corresponding to the address information in the read operation frame to the sampling unit 303.

Specifically, after completing receiving the read operation frame, the SSI slave module sends a response signal, that is, sends a write operation frame, to instruct the SSI master module to receive data; and then send data information. Alternatively, after the SSI master module completes sending the address information of the read operation frame, a right to control the single wire is switched, and the SSI slave module sends data information in the read operation frame.

The sampling unit 303 is configured to sample the data information from the SSI slave module.

In the embodiment of the present invention, the following technical solution is employed: the sample delay controlling unit is used to send the delay instruction, so that the state machine unit delays sending the sample control signal, and the sampling unit is controlled to delay sampling the data information. Therefore, the problem of data reception errors caused by slow discharging of an IO PAD pull-down resistor is avoided. Compared with the method of adding a board level pull-down resistor in the prior art, the solution according to the embodiment has better stability and flexibility.

Figure 4:
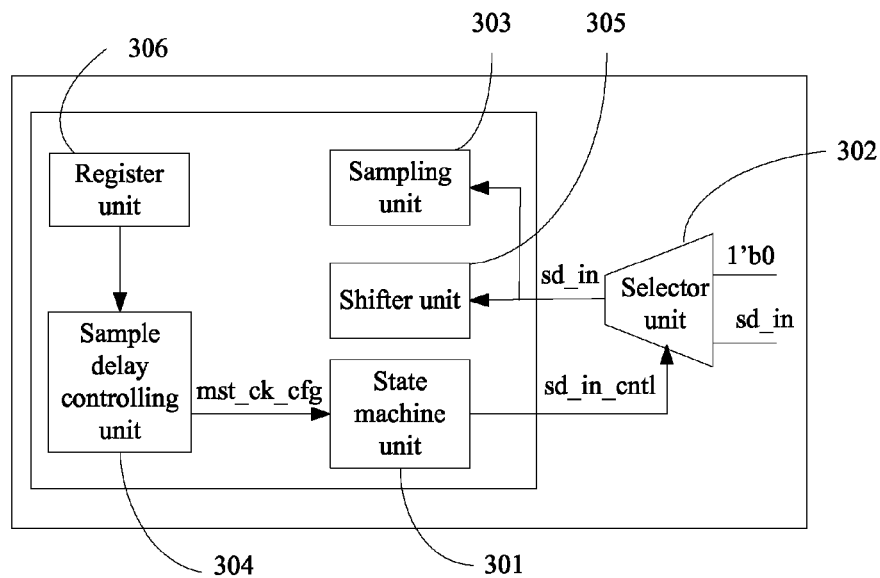
FIG. 4 is a schematic structural diagram of an SSI Master according to another embodiment of the present invention.

As shown in FIG. 4, in another embodiment, the SSI master module according to the present invention may further include a register unit 306. The register unit is connected to a sample delay controlling unit 304, and is configured to store a configuration item mst_ck_cfg for indicating the delay period, where the configuration item mst_ck_cfg is included in the delay instruction to send to the state machine unit, so that the state machine unit delays sending the sample control signal, and the delay period is 0.5×mst_ck_cfg. The configuration item mst_ck_cfg is input by an operator in advance.

In another embodiment, the SSI master module according to the present invention may further include a shifter unit 305. The shifter unit 305 is connected to the selector unit 302 and the sampling unit 303, and is configured to implement serial input and temporary storage of data information.

The following further describes the units in the SSI master module according to the embodiment of the present invention in detail.

The selector unit 302 is specifically connected to the single wire through an IO PAD, where data information from the SSI Slave enters other units of the SSI master module through the selector unit 302. As shown in FIG. 4, sd_in represents input data information; 1′b0 is a default signal. By default, the selector unit 302 allows 1′b0 to enter and prevents sd_in from entering.

The state machine unit 301 may generate a sample control signal sd_in_cntl when the SSI master module completes sending the last bit of the address information in each read operation frame, and send the sample control signal to the selector unit 302 to control the entering of sd_in. The selector unit 302 enables a transmission channel between the selector unit and another unit such as the sampling unit 303 and allows sd_in to enter other units of the SSI master module only if sd_in_cntl is valid. Generally, sd_in_cntl is active high.

The sample delay controlling unit 304 may be a signal sending circuit. Each time the SSI master module is powered on or reset, the signal sending circuit obtains the configuration item mst_ck_cfg from the register unit 306 and generates a delay instruction including the configuration item mst_ck_cfg to send it to the state machine unit 301, so that the state machine unit 301, starting from a moment when the SSI master module completes sending the last bit of the address information in each read operation frame, waits for a delay period to send the sample control signal sd_in_cntl to the selector unit 302, where the delay period is 0.5×mst_ck_cfg. It should be noted that each time the SSI master module is powered on or reset, the sample delay controlling unit 304 needs to send the delay instruction only once, and sends a delay instruction again if the SSI master module is reset later.

A process for the sampling unit 303 to sample data information is specifically a process of converting a level signal from the SSI slave module into a binary signal, that is, a process in which a high level is converted into 1 and a low level is converted into 0. The SSI master module is a peripheral interface of a chip, and the binary data information sampled and obtained by the sampling unit of the SSI master module is finally transferred to the chip.

The SSI master module according to the present invention, by controlling the sampling unit 303 to delay sampling the data information, ignores the period where the IO PAD becomes high level due to automatic discharging of the pull-down resistor; after the delay period elapses, continues to perform an operation such as sampling, thereby avoiding data reception errors caused by the SSI master module because the data information is sampled too early before the IO PAD completes discharging.

The following further describes the implementation principle of the technical solution according to the embodiment of the present invention.

Figure 5:
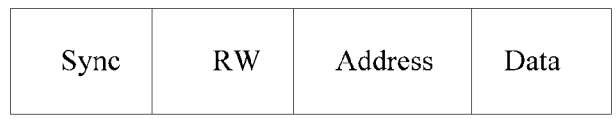
FIG. 5 is a schematic diagram of a frame structure of a write operation in an SSI transmission protocol.
Figure 6:
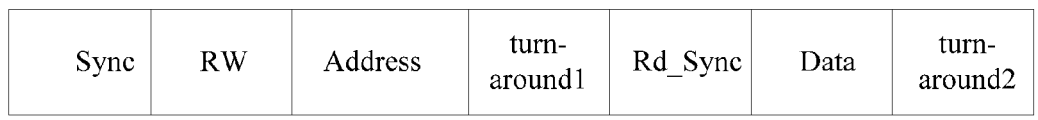
FIG. 6 is a schematic diagram of a frame structure of a read operation in an SSI transmission protocol.

In an SSI transmission protocol, a frame structure of a write operation and frame structure of a read operation are shown in FIG. 5 and FIG. 6 respectively, where, in the frame structures:

Sync represents a synchronization bit, and is used to instruct the SSI Slave to start receiving a signal;

RW represents a read and write flag bit, and is used to notify the SSI Slave of a type of an operation that is currently performed, where 0 indicates a write operation and 1 indicates a read operation;

Address represents address information;

Data represents data information;

turn-around1 indicates a first stage of switching the right to control the single wire, where the SSI Master completes sending last bit of the address information and then releases the single wire control, and the SSI Slave obtains the right to control the single wire after receiving the last bit of the address information and drives the single wire to a low level;

Rd_Sync represents a read data synchronization bit, and is used to instruct the SSI Master to receive data returned by the SSI Slave; and turn-around2 indicates a second stage of switching the right to control the single wire, where the SSI Slave completes sending a last data signal and then releases the right to control the single wire, and the SSI Master obtains the right to control the single wire after receiving the last data signal and drives the single wire to a low level for preparation for the next transmission.

The SSI Master releases the right to control the single wire when completing sending the last bit of the address information. Because the IO PAD has a pull-down resistor, the IO PAD discharges automatically; because the discharging speed is low, a semi-high level may be sampled by the SSI Master during sampling, where a current level may be mistakenly regarded as Rd_Sync and sampling data information is started too early. However, in such cases, Rd_Sync does not start actually, and the SSI Slave does not control the single wire or start returning data, which may result in a data reception error of the SSI Master.

According to the foregoing analysis, in order to avoid the data reception error of the SSI Master, it must be ensured that the SSI Slave controls the single wire when the SSI Master performs sampling. In other words, the following inequation must be satisfied:

$$(\text{Master\_out\_dly})_{WC}+(\text{Master\_in\_dly})_{WC}+ \\ (\text{Board\_dly})_{WC}+(\text{Board\_dly})_{WC}+ \\ (\text{Slave\_in\_dly})_{WC}+(\text{Slave\_out\_dly})_{WC}+\text{CLK\_} \\ \text{SKEW}+T2<T1 \qquad (1)$$

where $(\text{Master\_out\_dly})_{WC}+(\text{Master\_in\_dly})_{WC}$ is a maximum delay for signal transmission on the side of the SSI Master, which may be expressed as $(\text{Master Delay})_{WC}$; $(\text{Slave\_out\_dly})_{WC}+(\text{Slave\_in\_dly})_{WC}$ is a maximum delay for signal transmission on the side of the SSI Slave, which may be expressed as $(\text{Slave Delay})_{WC}$; $(\text{Board\_dly})_{WC}$ is a maximum delay for signal transmission of a board level, that is, a delay outside the chip; CLK_SKEW is a maximum clock deviation, which is 0.5 clock delay because SSI performs sampling at half-edge; T1 is a period from the moment when the SSI Master releases the last bit of the address information to a moment when the SSI Master starts checking an Rd_Sync bit; and T2 is a period from a moment when the SSI Slave receives the last bit of the address information from the SSI Master to a moment when the SSI Slave obtains a right to control the single wire.

The inequation (1) may be simplified into:

$$(\text{Master Delay})_{WC}(\text{Slave Delay})_{WC}+2\times \\ (\text{Board\_dly})_{WC}+\text{CLK\_SKEW}<T1-T2 \qquad (2)$$

Generally, the CLK_SKEW equals 0.5 clock delay, T1 equals 2.5 clock delays, and T2 equals 1 clock delay. The inequation (2) is converted into:

$$(\text{Master Delay})_{WC}+(\text{Slave Delay})_{WC}+2\times \\ (\text{Board\_dly})_{WC}<1 \text{ clock delay} \qquad (3)$$

If an on-chip constraint of the chip reserves a small margin for off-chip and the board level delay is not stable, it is likely that the foregoing inequation is not satisfied.

In the foregoing inequation, T1 is required for SSI Master design; T2 is required for SSI Slave design; other delays, including $(\text{Master Delay})_{WC}$, $(\text{Slave Delay})_{WC}$, and $(\text{Board\_dly})_{WC}$ are independent of the SSI design itself. Therefore, it is possible to change a design value of T1 or T2 to control the single wire transmission delay, so that the foregoing inequation is satisfied, thereby avoiding data reception errors for the SSI Master.

Generally, no bus control is available on the SSI Slave side and the SSI Slave has no configuration interface thereof; therefore, T2 cannot be controlled. However, bus control is available on the SSI Master side, and a configuration interface is available where an internal register of the SSI Master may be configured. Therefore, it is practical to make T1 adjustable, so that the foregoing inequation is satisfied.

The SSI master module according to the embodiment of the present invention delays the sampling time, and the delay period is 0.5×mst_ck_cfg; therefore, a period from a moment when the SSI Master releases the last bit of the address information to a moment when the SSI Master starts checking an Sync bit is changed to T1+0.5×mst_ck_cfg. Therefore, the foregoing inequation (2) is changed into:

$$\text{(Master Delay)}_{WC}+\text{(Slave Delay)}_{WC}+2\times\text{(Board\_dly)}_{WC}+\text{CLK\_SKEW}<0.5\times\text{mst\_ck\_cfg}+T1-T2 \quad (4)$$

where (Master Delay)$_{WC}$ is a maximum delay for signal transmission on the side of the SSI master module, (Slave Delay)$_{WC}$ is a maximum delay for signal transmission on a side of the SSI slave module, (Board_dly)$_{WC}$ is a maximum delay for signal transmission of a board level, T1 is a period from the moment when the SSI master module releases the last bit of the address information in the read operation frame to a moment when the SSI master module starts checking a read data synchronization bit in the read operation frame, and T2 is a period starting from a moment when the SSI slave module receives the last bit of the address information in the read operation frame sent by the SSI master module to a moment when the SSI slave module obtains a right to control the single wire. Generally, T1 equals 2.5 clock delays, T2 equals 1 clock delay; therefore, T1−T2=1.5 clock delays.

When the inequation (4) is satisfied, it can entirely avoid that the SSI Master samples data information too early caused by automatic discharging of the IO PAD, thereby avoiding a data reception error.

According to the above description, the embodiment of the present invention provides an SSI master module which can avoid a data reception error caused by the slow discharging of the IO PAD pull-down resistor. Compared with the method of adding a board level pull-down resistor in the prior art, the solution according to the embodiment has better stability and flexibility.

Figure 7:
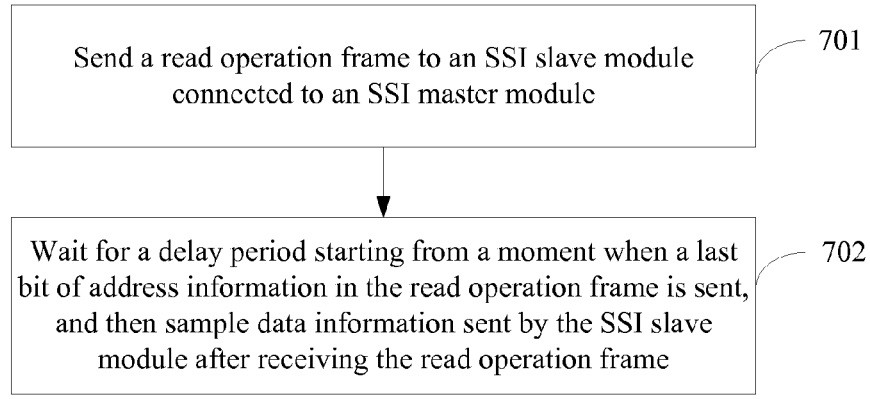
FIG. 7 is a flowchart of a method for an SSI Master to sample data information according to an embodiment of the present invention.

As shown in FIG. 7, an embodiment of the present invention further provides a method for an SSI master module to sample data information, so as to avoid a data reception error for the SSI master module, where an SSI master module is connected to an SSI slave module through a single wire. The method includes the following:

701. Send a read operation frame to an SSI slave module connected to an SSI master module.

702. Wait for a delay period starting from a moment when a last bit of the address information in the read operation frame is sent, and then sample data information sent by the SSI slave module after receiving the read operation frame.

Alternatively, the sampling the data information sent by the SSI slave module after receiving the read operation frame includes: checking whether a read data synchronization bit in a write operation frame sent by the SSI slave module after receiving the read operation frame is valid, and if the read data synchronization bit is valid, sampling the data information. Generally, the read data synchronization bit is active high.

In the method according to the embodiment, a predefined delay period as a wait period is added after the SSI master module releases the right to control the single wire, so as to ignore a period where the IO PAD becomes high level because of automatic discharging of the pull-down resistor; after the delay period elapses, a normal operation is continued. Therefore, it can avoid that the SSI Master samples data information too early caused by automatic charging of the IO PAD, thereby avoiding a data reception error.

Further, the predefined delay period is 0.5×mst_ck_cfg and satisfies the inequation (4):

$$\text{(Master Delay)}_{WC}+\text{(Slave Delay)}_{WC}+2\times\text{(Board\_dly)}_{WC}+\text{CLK\_SKEW}<0.5\times\text{mst\_ck\_cfg}+T1-T2$$

When the inequation is satisfied, it can entirely avoid that the SSI Master samples data information too early caused by automatic discharging of the IO PAD, thereby avoiding a data reception error.

According to the above description, the embodiment of the present invention provides a method for an SSI master module to sample data information, which can avoid a data reception error caused by the slow discharging of the IO PAD pull-down resistor. Compared with the method of adding a board level pull-down resistor in the prior art, the solution according to the embodiment has better stability and flexibility.

Persons of ordinary skill in the art may understand that all or a part of the steps of the various methods according to the embodiments may be implemented by hardware or by a program instructing relevant hardware. The program may be stored in a computer readable storage medium, and the storage medium may include a read-only memory, a random access memory, a magnetic disk, or a CD-ROM.

The SSI master module and a method thereof for sampling data information according to the embodiments of the present invention are described in detail above. However, the description of the embodiments is merely used to help understand the method of the present invention and a core idea thereof, which shall not be understood as a limit to the present invention. Variations or replacements that may be easily thought of by persons skilled in the art within the technical scope disclosed in the present invention shall fall within the protection scope of the present invention.

What is claimed is:

1. A single wire-serial interface_(SSI) master module comprising:
    a state machine unit;
    a selector unit;
    a sampling unit; and
    a sample delay controlling unit;
    wherein
    the sample delay controlling unit is connected to the state machine unit and is configured to send, before the SSI master module sends a last bit of address information in a first read operation each time after being power on or reset, a delay instruction to the state machine unit;
    wherein the state machine unit is connected to the selector unit and is configured to:
       wait, according to the delay instruction, for a delay period starting from a moment when the SSI master module completes sending the last bit of the address information in the read operation frame, wherein the delay period depends on a maximum delay for signal transmission on a side of the SSI master module and a maximum delay for signal transmission on a side of an SSI slave module, and
       send a sample control signal to the selector unit;
    wherein the selector unit includes a first end connected to the sampling unit and a second end connected to the SSI slave module through a single wire, and is configured to, after receiving the sample control signal, enable a transmission channel between the selector unit and the sampling unit enable the SSI slave module to input data information corresponding to the address information in the read operation frame into the sampling unit; and
    wherein the sampling unit is configured to sample the data information from the SSI slave module.

2. The SSI master module according to claim 1, wherein the delay instruction sent by the sample delay controlling unit comprises a configuration item indicating the delay period; and wherein the state machine unit is configured to wait, according to the delay instruction, for a delay period equal to half the delay period indicated by the configuration item starting from the moment when the SSI master module completes sending the last bit of the address information in the read operation frame, and to send the sample control signal to the selector unit.

3. The SSI master module according to claim 2, wherein:
the configuration item in the delay instruction sent by the sample delay controlling unit satisfies the condition:
$(\text{Master Delay})_{WC} + (\text{Slave Delay})_{WC} + 2 \times (\text{Board\_dly})_{WC} + \text{CLK\_SKEW} < 0.5 \times \text{mst\_ck\_cfg} + T1 - T2;$ wherein $(\text{Master Delay})_{WC}$ is the maximum delay for signal transmission on the side of the SSI master module, wherein $(\text{Slave Delay})_{WC}$ is the maximum delay for signal transmission on the side of the SSI slave module, wherein $(\text{Board\_dly})_{WC}$ is a maximum delay for signal transmission of a board level, wherein CLK_SKEW is a maximum clock deviation, wherein T1 is a period from the moment when the SSI master module completes sending the last bit of the address information in the read operation frame to a moment when the SSI master module starts checking a read data synchronization bit in the read operation frame, wherein T2 is a period from a moment when the SSI slave module receives the last bit of the address information in the read operation frame sent by the SSI master module to a moment when the SSI slave module obtains a right to control the single wire, and wherein mst_ck_cfg is the delay period.

4. A method for a single wire serial interface (SSI) master module to sample data information, comprising:

sending a read operation frame to an SSI slave module connected to an SSI master module; and waiting for a delay period starting from a moment when the last bit of address information in the read operation frame is sent, wherein the delay period depends on a maximum delay for signal transmission on a side of the SSI master module and a maximum delay for signal transmission on a side of the SSI slave module, and sampling data information sent by the SSI slave module after receiving the read operation frame.

5. The method according to claim 4, wherein sampling the data information sent by the SSI slave module after receiving the read operation frame comprises:

checking whether a read data synchronization bit in a write operation frame sent by the SSI slave module after receiving the read operation frame is valid; and sampling the data information sent by the SSI slave module if the read data synchronization bit is valid.

6. The method according to claim 4, wherein:
the delay period is equal to 0.5×mst_ck_cfg and satisfies the following condition:
$(\text{Master Delay})_{WC} + (\text{Slave Delay})_{WC} + 2 \times (\text{Board\_dly})_{WC} + \text{CLK\_SKEW} < 0.5 \times \text{mst\_ck\_cfg} + T1 - T2;$ wherein $(\text{Master Delay})_{WC}$ is the maximum delay for signal transmission on the side of the SSI master module, wherein $(\text{Slave Delay})_{WC}$ is the maximum delay for signal transmission on the side of the SSI slave module, wherein $(\text{Board\_dly})_{WC}$ is a maximum delay for signal transmission of a board level, wherein CLK_SKEW is a maximum clock deviation, wherein T1 is a period from the moment when the SSI master module completes sending the last bit of the address information in the read operation frame to a moment when the SSI master module starts checking a read data synchronization bit in the read operation frame, and wherein T2 is a period from a moment when the SSI slave module receives the last bit of the address information in the read operation frame sent by the SSI master module to a moment when the SSI slave module obtains a right to control the single wire.

* * * * *

UNITED STATES PATENT AND TRADEMARK OFFICE
CERTIFICATE OF CORRECTION

PATENT NO.        : 9,588,933 B2                                Page 1 of 1
APPLICATION NO.   : 14/089401
DATED             : March 7, 2017
INVENTOR(S)       : Qi Wang It is certified that error appears in the above-identified patent and that said Letters Patent is hereby corrected as shown below:

On the Title Page

Item (72), city and country for inventor Qi Wang should read:
-- Shanghai (CN) --.

Signed and Sealed this
Twenty-third Day of May, 2017

Michelle K. Lee
*Director of the United States Patent and Trademark Office*